(12) United States Patent
Artiles et al.

(10) Patent No.: US 9,039,013 B2
(45) Date of Patent: May 26, 2015

(54) HYDRODYNAMIC NON-CONTACTING SEAL

(75) Inventors: Antonio F. Artiles, Vernon, CT (US); Ethan K. Stearns, Mansfield, CT (US)

(73) Assignee: United Technologies Corporation, Hartford, CT (US)

( * ) Notice: Subject to any disclaimer, the term of this patent is extended or adjusted under 35 U.S.C. 154(b) by 57 days.

(21) Appl. No.: 13/100,830

(22) Filed: May 4, 2011

(65) Prior Publication Data
US 2012/0280458 A1    Nov. 8, 2012

(51) Int. Cl.
*F16J 15/34*    (2006.01)

(52) U.S. Cl.
CPC ................... *F16J 15/3412* (2013.01)

(58) Field of Classification Search
USPC .................................................. 277/399, 400
See application file for complete search history.

(56) References Cited

U.S. PATENT DOCUMENTS

| | | | | |
|---|---|---|---|---|
| 3,782,737 | A * | 1/1974 | Ludwig et al. | 277/400 |
| 5,145,189 | A | 9/1992 | Pope | |
| 5,180,173 | A * | 1/1993 | Kimura et al. | 277/400 |
| 5,222,743 | A * | 6/1993 | Goldswain et al. | 277/400 |
| 5,224,714 | A * | 7/1993 | Kimura et al. | 277/400 |
| 5,435,574 | A * | 7/1995 | Victor et al. | 277/379 |
| 5,441,283 | A | 8/1995 | Pecht et al. | |
| 5,454,572 | A * | 10/1995 | Pospisil | 277/368 |
| 5,496,047 | A | 3/1996 | Goldswain et al. | |
| 5,529,315 | A * | 6/1996 | Borrino et al. | 277/352 |
| 5,556,111 | A * | 9/1996 | Sedy | 277/400 |
| 5,605,339 | A * | 2/1997 | Pecht et al. | 277/400 |
| 5,702,110 | A | 12/1997 | Sedy | |
| 5,722,665 | A | 3/1998 | Sedy et al. | |
| 5,934,683 | A * | 8/1999 | Sieghartner | 277/400 |
| 5,941,532 | A * | 8/1999 | Flaherty et al. | 277/400 |
| 6,142,478 | A | 11/2000 | Pecht et al. | |
| 6,257,589 | B1 * | 7/2001 | Flaherty et al. | 277/400 |
| 6,289,872 | B1 * | 9/2001 | Dardalis | 123/314 |
| 6,575,470 | B1 | 6/2003 | Gacek et al. | |
| 6,726,213 | B2 * | 4/2004 | Wang | 277/400 |
| 7,004,119 | B2 * | 2/2006 | Dardalis | 123/43 R |
| 7,194,803 | B2 | 3/2007 | Young et al. | |
| 7,797,941 | B2 | 9/2010 | Munsell et al. | |
| 8,162,322 | B2 * | 4/2012 | Flaherty | 277/400 |
| 2009/0212501 | A1 | 8/2009 | Glahn et al. | |

FOREIGN PATENT DOCUMENTS

EP    298324    1/1989

OTHER PUBLICATIONS

EP Search Report for EP 12166449 dated Aug. 30, 2012.

* cited by examiner

*Primary Examiner* — Kristina Fulton
*Assistant Examiner* — Eugene G Byrd
(74) *Attorney, Agent, or Firm* — O'Shea Getz P.C.

(57) ABSTRACT

A hydrodynamic non-contacting seal wherein the sealing surface of a rotatable sealing member is grooved in a spiral pattern such that the depth of the grooves decreases in a direction opposite to the direction of rotation of the rotatable sealing member.

21 Claims, 4 Drawing Sheets

HYDRODYNAMIC NON-CONTACTING SEAL

BACKGROUND OF THE INVENTION

1. Technical Field

This invention relates generally to hydrodynamic non-contacting seals and particularly to a hydrodynamic non-contacting face seal for use in rotating machinery such as gas turbine engines.

2. Background Information

Gas turbine engines, such as those which power aircraft and industrial equipment, employ a compressor to compress air which is drawn into the engine and a turbine to capture energy associated with the combustion of a fuel-air mixture which is exhausted from the engine's combustor. The compressor and turbine employ rotors which typically comprise a multiplicity of airfoil blades mounted on or formed integrally into the rims of a plurality of disks mounted on a shaft. Typically, such shafts are rotatably supported on bearings lubricated with a lubricant such as oil, disposed within the interior of a bearing compartment which is pressurized with a mixture of air and lubricating oil. It is well known to provide bearing compartments with mechanical seals, such as non-contacting face seals, as a means to minimize the escape of the lubricating fluid from the compartments' forward and aft ends. The air outside of these ends is typically at a higher pressure than the pressure of the air-oil mixture inside the compartment. Such face seals typically employ a stationary sealing member which is mounted within the bearing compartment and a rotatable sealing member or seal ring mounted on the rotor shaft. The stationary sealing member is usually provided with a smooth, continuous (uninterrupted) sealing surface which is disposed in face-to-face opposed relationship to a sealing surface of the rotatable seal ring. The sealing surface of the rotatable seal ring is often equipped with hydrodynamic features such as with a pattern of spiral grooves. Fluid such as the above-noted air enters the grooves and the space between the seal members from outside the compartment. The sealing fluid is pumped within the spiral grooves, raising the pressure thereof such that the elevated pressure of the fluid within the grooves forms a fluid barrier between the two sealing members thereby restricting the leakage of the air-oil mixture from inside the compartment into the gap between the sealing members. It will be appreciated that the pumping characteristics of the grooves to provide the elevated pressure fluid seal between the two sealing members is a function of the characteristics of the fluid outside the compartment, the rotational speed of the rotatable sealing member and the geometry of the grooves themselves. Since rotating machinery such as gas turbine engines are required to operate at a wide range of rotational speeds, the ability of the grooves to pump adequately to provide the pressurization of sealing fluid between the sealing members over such a wide range of rotational shaft speeds is imperative. Prior art attempts to provide adequate sealing with the above-noted spiral groove face seals throughout a wide range of operating conditions of the rotating machinery have taken the form of multiple spiral groove patterns in the rotating seal member or a mixture of spiral seal patterns with other groove configurations such as circumferential grooves and radial grooves which have proven less than adequate to provide the necessary sealing over a wide range of operating speeds.

For these reasons, it is desired to provide an improved hydrodynamic non-contacting face seal suitable for use in the bearing compartments of gas turbine engines which will provide adequate sealing throughout the wide ranges of operating speeds required of such gas turbine engines.

SUMMARY OF THE DISCLOSURE

In accordance with the present invention, a hydrodynamic non-contacting seal for rotating machinery such as gas turbine engines and particularly, the bearing compartments thereof comprises a stationary sealing member having a sealing surface, a rotatable sealing member in close proximity to the stationary seal member and having a seal surface opposing the sealing surface of the stationary seal member, the rotatable seal member including in the seal surface thereof, a radially outwardly extending spiral pattern of grooves, each of the grooves having a width and a depth, wherein the depth of each of the grooves decreases across the width thereof in a direction opposite to the circumferential direction of rotation of the rotatable seal member. This decreasing groove depth may be achieved in a number of different ways. In one preferred embodiment, the bottom walls of the grooves are sloped between the groove sidewalls which are at two different depths. In another embodiment, the bottom wall of the grooves includes first and second stepped portions, the first stepped portion being disposed at a depth equal to the height of one of the grooved sidewalls and the second stepped portion being disposed at a depth equal to the height of the opposite grooved sidewall, the two grooved sidewalls having different heights. The decreasing depth of the grooves in a direction opposite to the direction of rotation of the rotatable seal member causes an increase in fluid pressure within the groove from the deepest portion of the grooves to the more shallow portion thereof resulting in adequate pressurization of fluid within the grooves over a wide range of rotational speeds of the rotatable seal member and a wide range of fluid characteristics (pressure, density, viscosity, etc.) of the sealing fluids of the present invention.

DETAILED DESCRIPTION OF THE INVENTION

Figure 1:
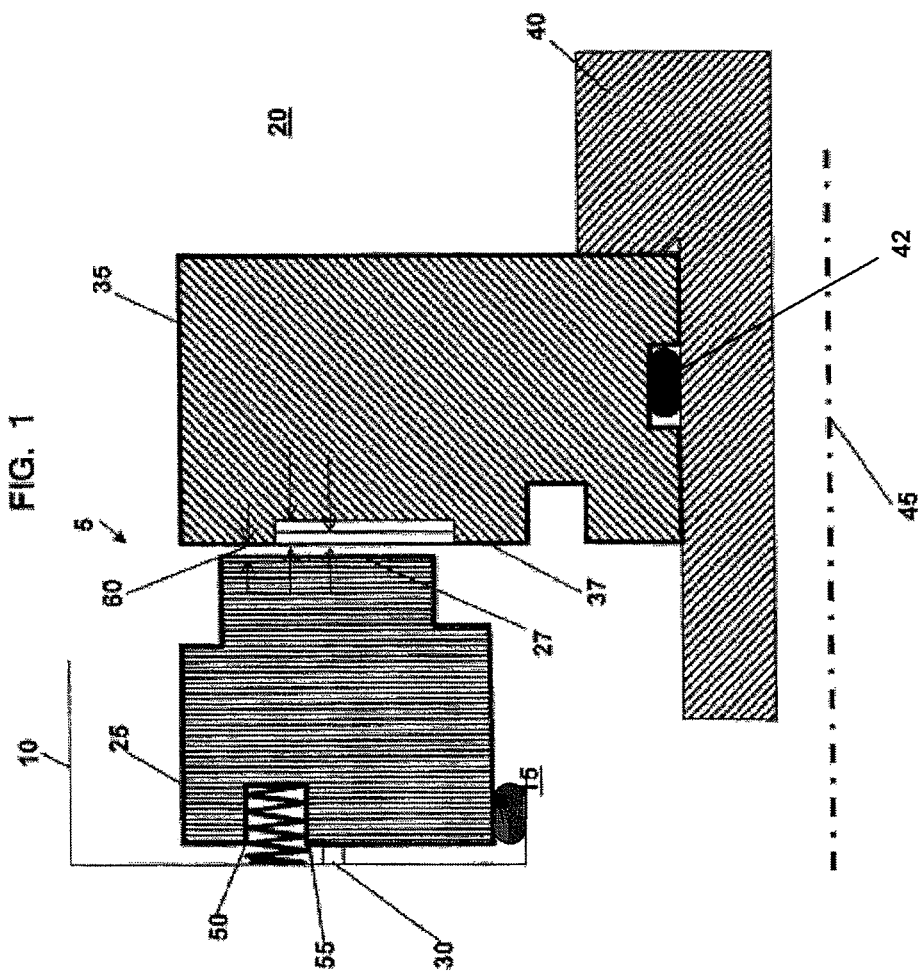
FIG. 1 is a sectional elevation of the hydrodynamic non-contacting seal of the present invention.

Referring to the drawings and particularly to FIG. 1 thereof, a hydrodynamic non-contacting seal of the present invention is shown at 5 within an enclosure 10 such as a bearing compartment for a gas turbine engine. Enclosure 10 encloses an inner cavity 15 pressurized with fluid at a higher pressure and an outer cavity 20 pressurized with fluid at a lower pressure. When employed in a bearing compartment of a gas turbine engine, the fluid in inner cavity 15 comprises high pressure air, and the fluid in outer cavity 20 comprises a mixture of air and lubricant such as lubricating oil for the bearings (not shown) of the gas turbine engine rotor. Seal 5 comprises a stationary seal plate 25 having an annular flat sealing surface 27, mounted on any suitable bracket (not shown) having a pin 30 which is received in a mating aperture (not shown) to allow the stationary seal plate 25 to move horizontally without rotating. Seal 5 also includes a rotatable seal plate 35 having a flat rotatable annular surface 37 and mounted on, for rotation with a shaft 40. Rotatable seal plate 35 is sealed to shaft 40 by an o-ring 42 disposed therebetween. Shaft 40 may comprise a rotor shaft of a gas turbine engine or any other rotating machinery in which seal 5 is employed. Shaft 40 rotates about a central axis 45 of the engine or other rotating machinery. A coil spring 50 received within aperture 55 in seal plate 25 biases stationary seal plate 25 toward rotating seal ring 35. Stationary seal ring 25 and rotatable seal plate 35 are separated by a gap 60 which is filled with higher pressure fluid from inner cavity 15.

Figure 2:
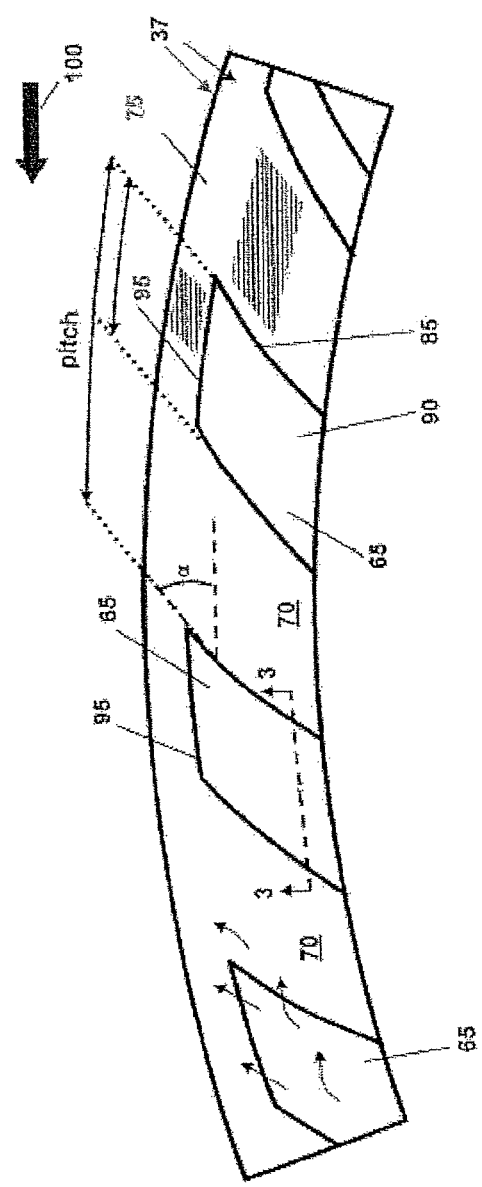
FIG. 2 is an end view of an annular mating portion of the sealing surface of a rotatable seal member employed in the seal shown in FIG. 1.

Referring to FIG. 2, the portion of sealing surface 37 of seal plate 35 which mates with the stationary plate 25 is provided with a plurality of grooves 65 in a radially outwardly extending spiral pattern, each of the grooves 65 extending from the inner radius of sealing surface 37 to a location approximately 60% to 80% of the radial expanse of the same sealing surface. As shown in FIG. 2, the grooves 65 are separated by ungrooved dam portions 70 of sealing surface 37 and terminate at radially outer ends thereof, at an ungrooved circumferential dam portion 75 of sealing surface 37. The grooves 65 are angularly offset from the direction of rotation of seal plate 35 by a constant angle α of approximately 20° to 45°, such that they traverse a logarithmic spiral path from end to end.

Still referring to FIG. 2, each of grooves 65 includes a pair of parallel opposed sidewalls 85 and a bottom wall 90 extending between the sidewalls as well as a circumferential end wall 95 which joins the parallel opposed sidewalls 85.

Figure 3:
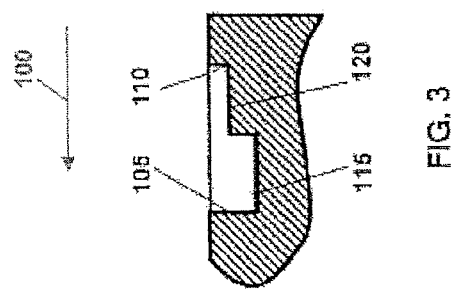
FIG. 3 is a sectional view of one of the grooves of the rotatable seal member shown in FIG. 2, taken along line 3-3 thereof.
Figure 4:
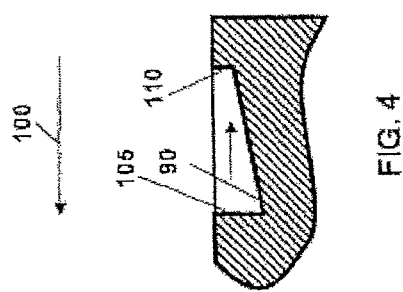
FIG. 4 is a view similar to FIG. 3, but showing an alternate embodiment of one of the spiral grooves of the rotatable seal member shown in FIG. 2.

Referring to FIGS. 3 and 4, the sidewalls of each groove differ in height. The forwardmost (with respect to the direction of rotation of seal plate 35 indicated by arrow 100) sidewall 105 is approximately 1.6 to 2.4 times the height of rearmost sidewall 110 whereby the depth of the grooves decrease across the width of the grooves in a direction opposite to the direction of rotation of the rotatable seal plate.

The decreasing groove depth in a direction opposite to the direction of rotation of seal plate 35 may be achieved in various ways. As illustrated in FIG. 3, a bottom groove wall may be stepped to include a deeper portion 115 at a depth equal to the height of sidewall 105 and a shallower portion 120 at a depth equal to the height of sidewall 110. Alternatively, as shown in FIG. 4, bottom wall 90 may be a smooth (continuous) surface extending between the lower edges of sidewalls 105 and 110 whereby the depth of bottom wall 90 tapers between the two sidewalls.

In operation, higher pressure fluid in inner cavity 15 enters gap 60 between sealing surfaces 27 and 37 of stationary and rotating seal members 25 and 35. As rotatable seal ring 35 rotates with shaft 40, fluid within gap 60 enters the spiral grooves 65 of sealing surface 37. Rotation of seal ring 35 causes the fluid within the spiral grooves 65 to be pumped therethrough and to increase in pressure in the radial direction. The groove geometry of decreasing depth in a direction opposite to the direction of rotation causes the fluid within the grooves to further increase in pressure in the direction of decreasing depth, thereby establishing an even higher pressure fluid cushion within the grooves than conventional constant-depth grooves. This improved fluid cushion will more effectively seal stationary and rotatable sealing members 25 and 35 to each other thereby further preventing leakage of fluid from outer cavity 20 to inner cavity 15 through gap 60.

The geometry of the grooves employed in the present invention enables the seal hereof to be effective over a wide range of operating conditions, i.e., fluid pressures in inner and outer cavities 15 and 20 and rotational speeds of rotatable seal member 35 and shaft 40 unlike prior art spiral grooved non-contacting hydrodynamic face seals which have shown to be effective at more limited ranges of rotational speeds and fluid pressures in the higher and lower pressure cavities. The difference in height between the sidewalls of the grooves of the present invention will be determined based upon the anticipated range of operating conditions of the seal. That is, the anticipated range of rotational speeds of the rotating seal plate and the pressure difference between the fluid pressure in the inner and outer cavity.

While a specific embodiments of the present invention has been shown and described herein, it will be understood that various modifications of these embodiments may suggest themselves to those skilled in the art. For example, while a smooth-tapered bottom wall and a discontinuous stepped bottom wall have been illustrated and described to achieve the decrease in groove depth in a direction opposite to that of rotation of the rotatable seal member, it will be appreciated that various other schemes for achieving this decrease in groove depth in a direction opposite to the rotation of the rotatable seal ring may be employed. Likewise, while the stationary seal member has been illustrated and described as being biased toward the rotatable seal member by a coil spring, it will appreciated that various other techniques for biasing the two seal members together may be employed with equal utility. Also, while the rotatable seal member has been shown as being sealed to the shaft by an o-ring, it will be appreciated that the rotatable seal member may be sealed to the shaft by other sealing techniques. Accordingly, it will be understood that these and various other modifications of the preferred embodiments of the present invention as illustrated and described herein may be implemented without departing from the present invention and it is intended by the appended claims to cover these and any other such modifications which fall within the true spirit and scope of the invention herein.

Having thus described the invention, what is claimed is:

1. A hydrodynamic non-contacting seal comprising:
a stationary seal member having a sealing surface;
a rotatable seal member in close proximity to said stationary seal member and having a radially inner radius and a radial expanse, a sealing surface of said rotatable seal member opposing the sealing surface of said stationary seal member;
said rotatable seal member being adapted for rotation in a first circumferential direction and including, in the sealing surface thereof, a radially outwardly extending spiral pattern of grooves, each of said grooves having a width and a depth;
wherein the depth of each of said grooves decreases across the width thereof in a direction opposite to the circumferential direction of rotation of said rotatable seal member;
wherein the rotatable seal member extends radially between an inner surface and an outer surface, and each of the grooves extends radially into the rotatable seal member from an edge of the inner surface; and
wherein each of the grooves includes a pair of opposing sidewalls and a bottom wall, each sidewall has an inner edge and a height, and the bottom wall extends between the sidewalls at the inner edges thereof, and wherein the depth extends between the bottom wall and the sealing surface of the rotatable seal member.

2. The hydrodynamic non-contacting seal of claim 1, wherein said grooves extend along said sealing surface of said rotatable sealing member from the radially inner radius thereof to approximately 60% to 80% of the radial expanse of said rotatable seal member.

3. The hydrodynamic non-contacting seal of claim 1, wherein the opposing sidewalls comprise generally parallel sidewalls, and the height of one of said sidewalls is approximately 1.6 to 2.4 times the height of the other of said sidewalls.

4. The hydrodynamic non-contacting seal of claim 3, wherein said bottom wall is a continuous surface, sloping from said one side wall to said other side wall.

5. The hydrodynamic non-contacting seal of claim 3, wherein said bottom wall includes first and second stepped portions, said first stepped portion being disposed at a depth equal to the height of said first sidewall, said second stepped portion being disposed at a depth equal to the height of said second side wall.

6. The hydrodynamic non-contacting seal of claim 3, wherein said groove sidewalls along substantially the entire length thereof are constantly angularly offset from the direction of rotation of said rotatable seal member by a generally constant angle.

7. The hydrodynamic non-contacting seal of claim 6, wherein said angle is approximately 20° to 45°.

8. The hydrodynamic non-contacting seal of claim 1, wherein said stationary seal member is mechanically biased toward said rotatable seal member.

9. The hydrodynamic non-contacting seal of claim 8, wherein said stationary seal member is mechanically biased toward said rotatable seal member by a spring.

10. The hydrodynamic non-contacting seal of claim 1, wherein said stationary seal member is disposed in a region higher fluid pressure and said rotatable sealing member is disposed in a region of lower fluid pressure.

11. The hydrodynamic non-contacting seal of claim 1, wherein said rotatable seal member is adapted for mounting on a rotatable shaft.

12. The hydrodynamic non-contacting seal of claim 11, wherein said rotatable seal member is sealed to said shaft.

13. In a bearing compartment for a gas turbine engine having a rotor shaft adapted for support on bearings, a hydrodynamic non-contacting face seal comprising:
   a stationary seal ring having a continuous sealing surface disposed in a higher fluid pressure region of said bearing compartment;
   a rotatable seal plate mounted on said shaft in a lower pressure region of said bearing compartment, said rotatable seal plate having a grooved sealing surface opposed to and in close proximity to the sealing surface of said stationary seal ring;
   said sealing surface grooves in said sealing surface of said rotatable seal plate being disposed in a spiral pattern;
   each of said grooves having a width and a depth wherein the depth of each of said grooves decreases across the width thereof in a direction opposite to the direction of rotation of said rotatable seal plate;
   wherein the rotatable seal plate extends radially between an inner surface and an outer surface, and each of the grooves extends radially into the rotatable seal plate from an edge of the inner surface; and
   wherein each of the grooves includes a pair of opposing sidewalls and a bottom wall, each sidewall has an inner edge and a height, and the bottom wall extends between the sidewalls at the inner edges thereof, and wherein the depth extends between the bottom wall and the grooved sealing surface.

14. The face seal of claim 13, wherein said grooves in said sealing surface of said rotatable seal plate extend radially outwardly from below the inner portion of the sealing surface of said stationary ring to approximately 60% to 70% of the radial expanse of said stationary ring sealing surface.

15. The hydrodynamic non-contacting face seal of claim 13, wherein the opposing sidewalls comprises curved sidewalls, and the height of one of said sidewalls is approximately 1.6 to 2.4 times the height of the other of said sidewalls.

16. The hydrodynamic non-contacting face seal of claim 15, wherein said bottom wall is a continuous surface, sloping from said one side wall to said other side wall.

17. The hydrodynamic non-contacting face seal of claim 15, wherein said bottom wall includes first and second stepped portions, said first stepped portion being disposed at a depth equal to the height of said first sidewall, said second stepped portion being disposed at a depth equal to the height of said second sidewall.

18. The hydrodynamic non-contacting face seal of claim 15, wherein said groove sidewalls along substantially the entire length thereof are angularly offset from the direction of rotation of said rotatable seal member by an angle of approximately 20° to 45°.

19. The hydrodynamic non-contacting face seal of claim 13, wherein said stationary seal ring is resiliently biased toward said rotatable seal plate by a spring.

20. The hydrodynamic non-contacting face seal of claim 13, wherein said rotatable seal plate is sealed to said shaft by an o-ring disposed therebetween.

21. A hydrodynamic non-contacting seal comprising:
   a stationary seal member having a sealing surface;
   a rotatable seal member forming a seal with the stationary seal member and having a radially inner radius and a radial expanse, a sealing surface of the rotatable seal member opposing the sealing surface of the stationary seal member;
   the rotatable seal member adapted for rotation in a first circumferential direction and including, in the sealing surface thereof, a radially outwardly extending spiral pattern of grooves, each of said grooves having a width and a depth;
   wherein the depth of each of the grooves decreases across the width thereof in a direction opposite to the circumferential direction of rotation of the rotatable seal member; and
   wherein a first of the grooves includes a pair of opposing sidewalls and a bottom wall, each sidewall has an inner edge and a height, and the bottom wall extends between the sidewalls at the inner edges thereof, and wherein the depth extends between the bottom wall and the sealing surface of the rotatable seal member.

\* \* \* \* \*